Figure 1:
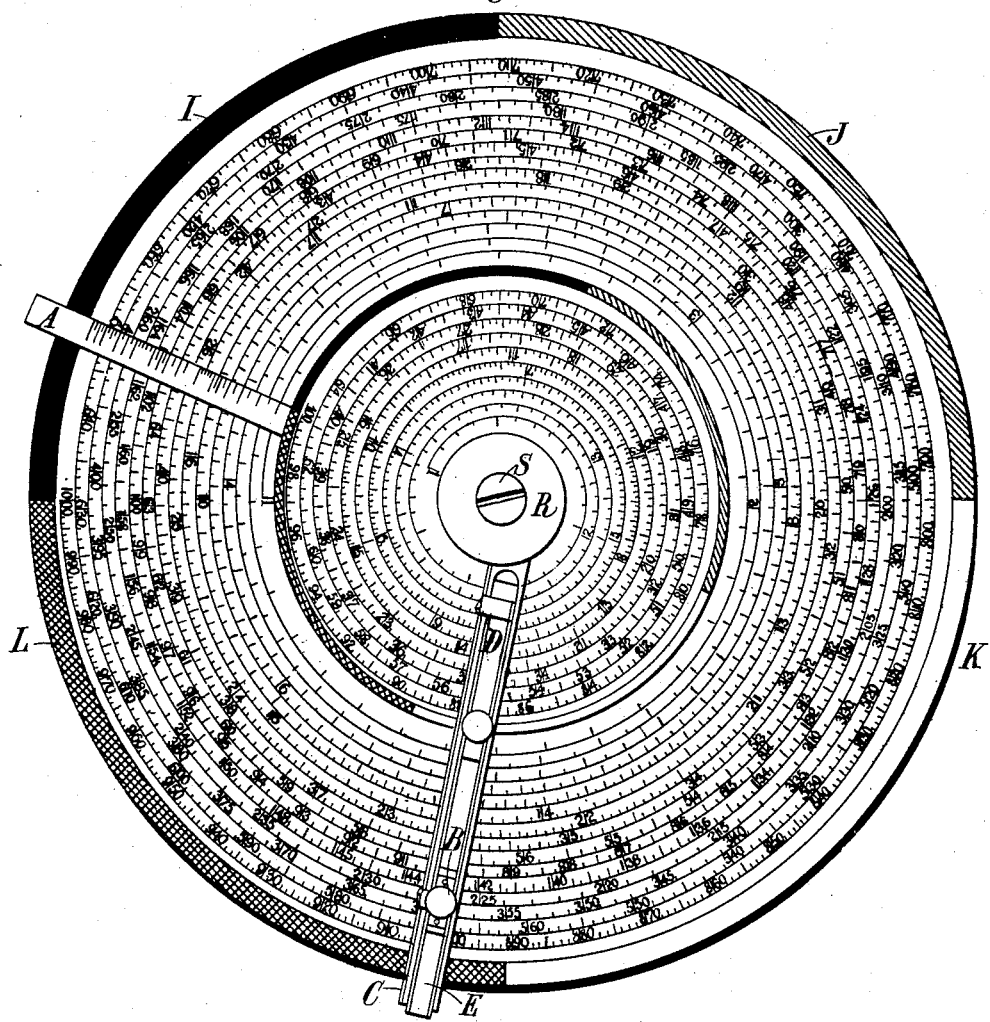

No. 769,044. PATENTED AUG. 30, 1904.
F. J. ANDERSON.
MECHANICAL CALCULATING DEVICE.
APPLICATION FILED JAN. 18, 1904.
NO MODEL. 3 SHEETS—SHEET 1.

Witnesses:
James L. Norris, Jr.
C. F. Kesler.

Inventor
Francis J. Anderson
By James L. Norris
Atty.

No. 769,044. PATENTED AUG. 30, 1904.
F. J. ANDERSON.
MECHANICAL CALCULATING DEVICE.
APPLICATION FILED JAN. 18, 1904.
NO MODEL. 3 SHEETS—SHEET 2.
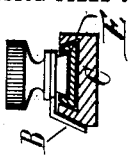
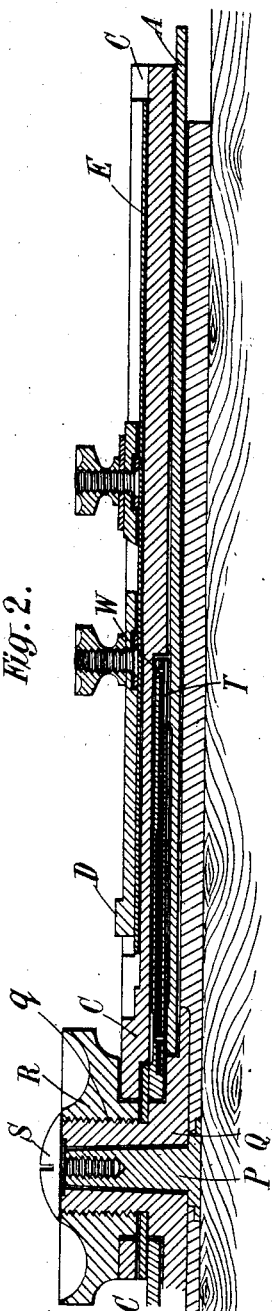
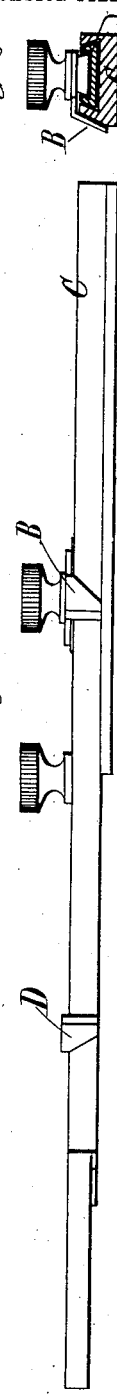
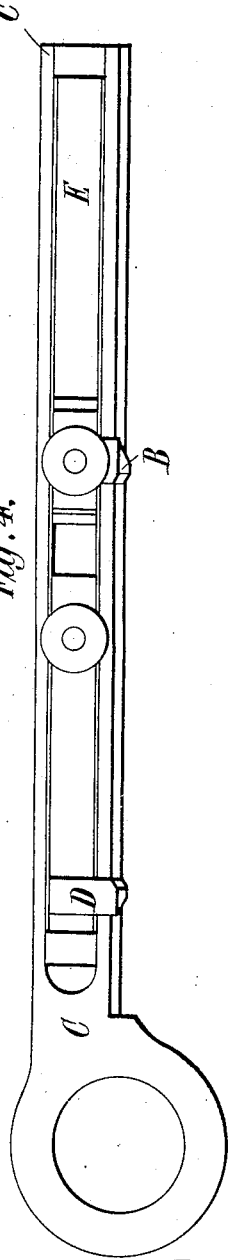
Witnesses:
James L. Norris, Jr.
C. D. Kesler.
Inventor
Francis J. Anderson
By James L. Norris.
Atty.

No. 769,044. PATENTED AUG. 30, 1904.
F. J. ANDERSON.
MECHANICAL CALCULATING DEVICE.
APPLICATION FILED JAN. 18, 1904.
NO MODEL. 3 SHEETS—SHEET 3.

Witnesses:
Jamie L. Norris, Jr.
C. D. Kesler.

Inventor
Francis J. Anderson
By James L. Norris.
Atty.

No. 769,044.

Patented August 30, 1904.

UNITED STATES PATENT OFFICE.

FRANCIS JAMES ANDERSON, OF WATERFORD, IRELAND.

MECHANICAL CALCULATING DEVICE.

SPECIFICATION forming part of Letters Patent No. 769,044, dated August 30, 1904.

Application filed January 18, 1904. Serial No. 189,600. (No model.)

*To all whom it may concern:*

Be it known that I, FRANCIS JAMES ANDERSON, major in His Britanic Majesty's Corps of Royal Engineers, a subject of the King of Great Britain, residing at The Barracks, Waterford, Ireland, have invented certain new and useful Improvements Relating to Mechanical Calculating Devices, of which the following is a specification.

This invention relates to a mechanical calculating device especially adapted for the use of those whose trade or profession involves laborious arithmetical calculations.

According to my invention I provide a device or apparatus comprising two or more relatively rotatable concentric disks which are of different diameters and carry concentric plane spirals graduated with logarithmic scales. Angularly movable over the spiral on one of the disks is a radial arm which I may term the "index" or "finder" arm and which serves to indicate the angular position into which the disks should be adjusted relatively to each other for the purposes of the required calculation. Said arm may also carry an index or finder scale, serving to indicate the radial distance from the center at which the various numerals will be found. I also provide one of the disks with what I may term a "supplementary" arm, which may be incapable of angular motion relatively to the disk that carries it, said supplementary arm being adapted to be brought into use when desired for assisting or supplementing the action of the aforesaid index-arm. A radial arm, which I may term the "traveler," is arranged to be angularly movable over the surface of both or all of the disks and is graduated with index-scales, serving to indicate, respectively, for each disk the distances from the center at which the various numbers or graduations on the disk will be found. Said traveler also carries a radially-movable scale and pointers, that are severally capable of being slid along the graduated traveler.

Means are provided whereby the various angularly and radially movable parts of the apparatus can be rendered either fixed or movable relatively to the adjacent parts, as desired.

In making a calculation with my improved device the index-arm and one of the pointers are caused to travel over their respective scales, so as to coöperate in representing or introducing into the calculation one of the numbers or quantities involved therein, while the same or another pointer is similarly caused to coöperate with the traveler to represent or introduce, in conjunction with the scales upon the traveler and one of the disks, the other number or quantity involved in the calculation. Where a third number or quantity is involved, it may be treated as a "constant" and may be introduced by means of the supplementary arm and the radially-movable scale on the traveler. When the various parts have been shifted into their proper positions as required for making the calculation, one or other of the said pointers will indicate or point out the answer or solution of the calculation on the disk where said answer or solution is to be found.

In graduating the aforesaid disks I arrive at the positions of the various graduations by multiplying the common logarithms of the various numbers by three hundred and sixty or some multiple of three hundred and sixty, as by preference eighteen hundred, and treating the results as degrees of angular measurements. The numeral "1" of each scale may be placed at the inner end of its spiral, the scale following the revolutions of said spiral, so that while the angular values of the logarithmic differences between consecutive numbers decrease their peripheral values increase as the spiral recedes from the center. The ever-increasing minuteness of the divisions of a logarithmic scale is thus naturally corrected.

Figure 6:
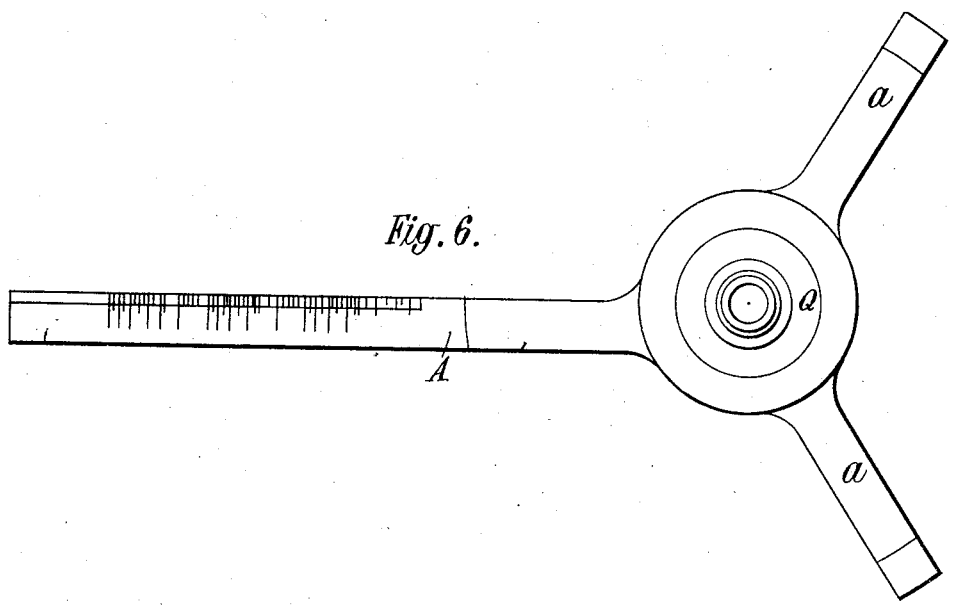
Figure 7:
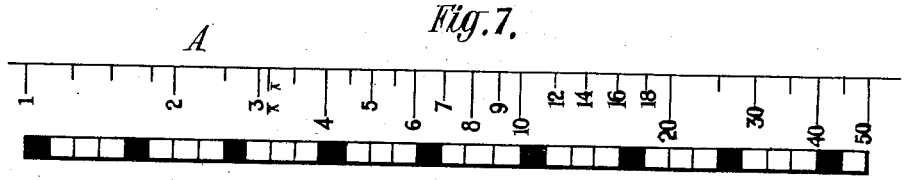
Figure 8:
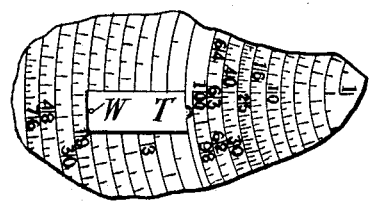

In the accompanying drawings, Figure 1 is a plan of an instrument embodying the features of my invention. Fig. 2 is a section, on a larger scale, through the index-arm and traveler, said arm and traveler being in different relative positions from those shown in Fig. 1. Fig. 3 is an elevation, Fig. 4 a plan, and Fig. 5 an end view, of the aforesaid traveler. Fig. 6 is a plan of the index-arm. Fig. 7 represents diagrammatically an example of one method of graduating said index-arm. Fig. 8 is a plan of a portion of the calculating device, showing a detail not seen in Fig. 1.

In the example illustrated in the drawings two disks only are employed. For astronomical and certain other calculations, however, involving a large number of factors three or more disks may be employed. The scales may be extended to any desired length, and the units may be subdivided to decimals, duodecimals, twenty-sevenths, or other parts, as required. In practice I have found it convenient in an instrument specially suitable for squaring, cubing, and pricing bills of quantities to take the units of the arithmetical scales (which in the example shown are graduated to "100" on the smaller and "1,000" on the larger disk) to represent feet and to subdivide the same to forty-eighths (representing quarter-inches) from "1" to "10," twenty-fourths (representing half-inches) from "10" to "25," twelfths (representing inches) from "25" to "200," and units thereafter. The use of a table for the conversion of duodecimals to decimals, and vice versa, simplifies the process of "moneying-out" where a decimal system of coinage prevails. Finer graduations may be employed, according to the size of the instrument, and constants, such as π, may be introduced into the scales, while two or more colors may be used to readily distinguish the graduations or figures from one another. Thus the units may be marked in one color and subdivisions in another. For the purpose of readily identifying the positions of the various members on the scales the surface of each disk may be divided into quadrants or any convenient number of sectors, which may be marginally distinguished by bands or marks of distinctive colors. Thus in Fig. 1 of the drawings the band I may, for instance, be black; J, blue; K, red, and L green. The upper or inner disk, Fig. 1, is centrally pivoted over the lower or outer disk, so that it can revolve in relation to the latter. The radial lines, which on the inner disk cut the spiral at the graduations "1," "10," and "100" and on the outer disk at the graduations "1," "10," "100," and "1,000," are called "zero-lines" for descriptive purposes and may in practice be distinctively colored. Between the two disks I may arrange the index-arm A, (shown to a larger scale in Fig. 6,) having splayed portions *a a* serving as supports on which the upper disk may revolve. If desired, said splayed portions may carry friction-rollers. The aforesaid arm has at its center a hollow cylindrical barrel-piece Q, which fits over a vertical pivot P, projecting from the center of the lower disk, as shown in section in Fig. 2. Said barrel-piece Q has on its exterior a screw-thread *q*, that engages with a clamping-screw R, by means of which the arm A can be clamped so that its beveled edge shall be in prolongation of any desired radius of the inner disk. Said beveled edge of the arm A, (see enlarged plan, Fig. 6.) overlying the outer spiral, carries the radial index or finder scale above referred to. This index-scale may have its numerals or graduations, or both, distinctively colored, according to the quadrants or other sectors of the disk in which the corresponding numerals occur, or the same result may be obtained by a repeating series of bands of similar distinctive colors each of breadth equal to the radial measurement by which the spiral recedes from the center while passing through a quadrant, (or sector.) Such an arrangement is shown enlarged in Fig. 7. Normally the arm A is clamped with its beveled edge in prolongation of the zero-line of the inner disk; but for the purpose of setting it to any other desired position the supplementary arm T is employed. Said arm slides telescopically in the body of the upper disk and can be drawn out by means of a stud W, so as to lie in prolongation of the zero-line, as illustrated in Fig. 8 and as hereinafter described.

The traveler C is centrally pivoted and works over both disks independently of the clamping-screw R. Said traveler is shown in plan in Fig. 4, in elevation in Fig. 3, and in section in Fig. 5 and has a beveled edge bearing colored index-scales for both disks similar to that on the arm A.

In the body of the traveler C works a slide-case E, which can be moved backward and forward radially. This slide-case carries two pointers B and D, attached to slides that can be clamped to it by screws, the slide of one of the pointers D taking the form of an elongating piece, so that said pointer D, which normally coincides with the inner end of the slide-case, may be extended therefrom. The slide carrying the other pointer, B, has its inner edge beveled and works on an index-scale (not shown) in the trough of the slide-case. This scale is so arranged that (the slide-case being in its normal position or "home") the upper beveled edge of the slide that carries the pointer B reads the same on it as said pointer B does on the outer index-scale of the traveler C. Over the clamping-screw R is a head-screw S, (see Fig. 2,) which works in the top of the pivot P and serves to keep the various parts of the instrument together.

The various parts of the instrument may of metal, metals, or other suitable materials alone or in combination, and the instrument, made to any appropriate scale, may be mounted on a base of wood or other convenient table, which may be rotatory, if desired.

The working of the instrument is best illustrated by examples, premising that the results are arrived at by a combination of exact circular (or angular) measurements, as marked on the spiral, with approximate radial measurements, as marked on the index or finder scales, the latter serving merely to obviate ambiguity as to the particular turn of the spiral, where the result is to be read. It is to be noted that in all operations arm A and pointer B work in conjunction, as do likewise traveler C and pointer D.

It is assumed in the following examples that at the commencement of each operation all parts of the instrument are in their normal position—that is, arm A is clamped to the zero-line of the inner disk, pointers B and D are each clamped to the figure "1" on its scale, and the slide-case E is home.

*Multiplication (involving two quantities)—Example I.*—Multiply twenty-seven by nineteen.

I. Set arm A to "27," (on the outer spiral.) To do this, note on its index or finder scale the color of the quadrant (in this case black) in which the desired number is situated, and placing the thumb and first finger of either hand on the outside end of arm A cause it, with the inner disk, (to which it is clamped,) to revolve till its beveled edge coincides with the graduation "27."

II. Set pointer B to "27," (by scale in trough of slide-case.) To do this, unclamp its screw and using the latter as a button slide B outward till the beveled top of its slide indicates, as near as may be, "27" on the scale in the trough of slide-case E. Then clamp.

III. Set traveler C to "19," (on the inner spiral.) To to this, cause it to revolve till its beveled edge coincides with the graduation "19," which the index or finder scale shows to be in the blue quadrant.

IV. Set pointer D to "19," (on the inner scale of beveled edge of traveler C.) To do this, use its screw (without unclamping) as a button and cause it to slide outward till it indicates as near as may be "19" on the beveled scale. This will carry the slide-case (to which pointer B has been clamped) outward to a like extent.

V. Read answer, (on the outer spiral,) "513," at the particular revolution indicated by pointer B. In doing this pointer B is simply a guide to the particular revolution of the spiral on which the answer is to be read, the exact line being that of the beveled edge of the traveler.

*Division—Example II.*—Divide six hundred and eighty-four by nineteen.

I. Set arm A to "19" on outer spiral.
II. Set pointer B to "19" on scale in trough, and clamp.
III. Set traveler C to "684" on outer spiral.
IV. Without unclamping, slide pointer B (carrying the slide-case E, to which pointer D is clamped) to "684" on its index-scale on beveled edge of traveler.
V. Read at pointer D answer, "36," (on inner spiral.)

*Multiplication (involving three quantities)—Example III.*—Multiply six and one forty-eighth by eight by seventeen.

I. Throw the instrument out of adjustment forward to the extent of six and one forty-eighth. To do this, (*a*) unclamp arm A by means of central clamping-screw R, set it to zero-line of outer spiral, and hold it there; (*b*) draw out supplementary arm T under zero-line of inner disk and set it to "$6\frac{1}{48}$" on outer spiral; clamp arm A; (*c*) push home the supplementary arm; (*d*) unclamp pointer D and holding it home set pointer B, which is clamped to slide-case E, to "$6\frac{1}{48}$" (as near as may be) on its scale; clamp pointer D.

II. Set arm A to "8."
III. Unclamp and set pointer B to "8" in trough, and clamp.
IV. Set traveler C to "17," inner scale.
V. Set pointer D to "17."
VI. Under pointer B read answer, "$818\frac{10}{12}$."

*Combined multiplication and division—Example IV.*—Multiply seventeen by three hundred and ninety and divide the product by thirteen.

I. Throw the instrument out of adjustment backward to the extent of thirteen. To do this, unclamp screw R, set arm A to "13" on the outer spiral and hold it there, draw out supplementary arm T and set it to zero-line on outer spiral, clamp screw R, push home supplementary arm.

II. Leaving both pointers clamped, set pointer D to "13" on its beveled scale.
III. Unclamp pointer B and set it to "390" on its beveled scale. Clamp it.
IV. Set arm A to "390" on the outer spiral.
V. Set traveler C to "17" on the inner spiral.
VI. Set D to "17" on its beveled scale.
VII. Under pointer B read answer, "510," on outer spiral.

The operations illustrated in the last two examples are specially useful where a constant has to be used in calculations, as by throwing the instrument out of gear to the required extent I automatically introduce the constant into all subsequent operations.

What I claim, and desire to secure by Letters Patent of the United States, is—

1. In a mechanical calculating device the combination of a plurality of relatively rotatable, spirally-graduated disks having a common center, a graduated arm also movable about said center, and means for enabling said arm to be held stationary for enabling the device to be thrown out of adjustment when it is desired to introduce constants or third quantities into the calculation.

2. In a mechanical calculating device, the combination of a plurality of relatively movable, spirally-graduated disks having a common center, with a revoluble traveler, a slide-case on said traveler, interadjustable pointers on said slide-case and an elongating piece working to index-scales on the various parts of said traveler.

3. In a mechanical calculating device the combination of a plurality of relatively revoluble, spirally-graduated disks superficially divided into sectors, with means for enabling the various sectors to be readily distinguished, and a plurality of angularly-movable radial arms having scales the graduations of which are distinguished from each other in a manner corresponding with that by which the aforesaid sectors are distinguished.

4. In a mechanical calculating device the combination of a plurality of relatively revoluble disks carrying spiral scales divided into clearly-distinguished sectors, with a plurality of angularly-movable arms with radial scales corresponding with the aforesaid spiral scales, and means for enabling the numbers corresponding with the various graduations on the radial scales to be located on the spiral scales by means of the sectors in which they are situated.

5. In a mechanical calculating device the combination of a plurality of relatively rotatable plane spiral scales, an index for enabling the requisite relative positions of said scales to be ascertained, a radially-movable pointer coöperating with said index for introducing one of the quantities into the calculation, an angularly-movable traveler, and a pointer coöperating with said traveler for introducing another quantity into the calculation.

6. In a mechanical calculating device the combination of a plurality of relatively rotatable plane spiral scales, means for enabling the requisite relative angular adjustment of said scales to be determined, means coöperating with one of said scales for introducing one of the given quantities into the calculation, means coöperating with the other scale for introducing another given quantity into the calculation, and means for throwing said scales out of adjustment with each other so as to introduce a third given quantity or constant into the calculation.

7. In a mechanical calculating device the combination of a plurality of relatively rotatable superposed disks carrying spiral scales, an index-arm for finding the requisite relative angular adjustment of said scales, an angularly-movable traveler, a movable pointer carried by said traveler and adapted to coöperate with the index-arm for introducing one of the given quantities, a movable pointer also carried by said traveler and adapted to coöperate therewith so as to introduce another quantity, a slidable scale on said traveler, and a radial arm carried by one of the aforesaid disks and adapted to coöperate with the said slidable scale for introducing a third quantity or constant into the calculation.

In testimony whereof I have hereunto set my hand, in presence of two subscribing witnesses, this 31st day of December, 1903.

FRANCIS JAMES ANDERSON.

Witnesses:
G. F. LONG,
D. N. COWELL.